United States Patent
Collins

(10) Patent No.: US 11,592,125 B2
(45) Date of Patent: Feb. 28, 2023

(54) PIPE BODY CATHODIC PROTECTION

(71) Applicant: Baker Hughes Energy Technology UK Limited, Bristol (GB)

(72) Inventor: Peter Francis Richard Collins, Newcastle Upon Tyne (GB)

(73) Assignee: Baker Hughes Energy Technology UK Limited, Bristol (GB)

(*) Notice: Subject to any disclaimer, the term of this patent is extended or adjusted under 35 U.S.C. 154(b) by 0 days.

(21) Appl. No.: 17/252,905

(22) PCT Filed: Jun. 14, 2019

(86) PCT No.: PCT/GB2019/051662
§ 371 (c)(1),
(2) Date: Dec. 16, 2020

(87) PCT Pub. No.: WO2019/243782
PCT Pub. Date: Dec. 26, 2019

(65) Prior Publication Data
US 2021/0262592 A1    Aug. 26, 2021

(30) Foreign Application Priority Data

Jun. 21, 2018 (GB) .................................. 1810228

(51) Int. Cl.
*F16L 11/12* (2006.01)
*C23F 13/10* (2006.01)
(Continued)

(52) U.S. Cl.
CPC ............. *F16L 11/12* (2013.01); *C23F 13/10* (2013.01); *F16L 11/081* (2013.01); *F16L 58/00* (2013.01)

(58) Field of Classification Search
CPC .......... F16L 11/081; F16L 11/12; F16L 58/00; C23F 13/10

(Continued)

(56) References Cited

U.S. PATENT DOCUMENTS

| 4,402,346 A | 9/1983 | Cheetham et al. |
| 7,081,187 B1 | 7/2006 | Schutt |

(Continued)

FOREIGN PATENT DOCUMENTS

| CN | 103388457 A | 11/2013 |
| FR | 2 286 331 | 4/1976 |

(Continued)

OTHER PUBLICATIONS

International Search report and Written Opinion for International Application No. PCT/GB2019/051662 dated Jul. 30, 2019; 14 pages.

(Continued)

*Primary Examiner* — Patrick F Brinson
(74) *Attorney, Agent, or Firm* — Knobbe Martens Olson and Bear, LLP

(57) ABSTRACT

A flexible pipe for subsea transportation of production fluids, a method of manufacturing flexible pipe body and a method of providing corrosion protection to armour wires of at least one tensile armour layer of a flexible pipe having a breached pipe annulus are disclosed. The flexible pipe comprises a fluid retaining layer, an outer sheath and at least one tensile armour layer comprising a plurality of helically wound monofilament armour wires of a first material, each having a non-circular cross section with an aspect ratio of greater than 1:2 disposed between the fluid retaining layer and the outer sheath. The tensile armour layer further comprises at least one helically wound elongate anode element substantially having a cross-section aspect ratio of 1:1 and comprising a further material, interposed between armour wires, the anode element cross section having an area that is 50% or less of a corresponding area of said non-circular cross section.

19 Claims, 9 Drawing Sheets

(51) Int. Cl.
*F16L 11/08* (2006.01)
*F16L 58/00* (2006.01)

(58) Field of Classification Search
USPC ................................ 138/133–136, 141, 140
See application file for complete search history.

(56) References Cited

U.S. PATENT DOCUMENTS

| | | | |
|---|---|---|---|
| 9,587,773 B2* | 3/2017 | Nokkentved | F16L 55/00 |
| 2003/0140977 A1* | 7/2003 | Berton | F16L 11/083 |
| | | | 138/104 |
| 2003/0164196 A1* | 9/2003 | Glejbol | F16L 11/083 |
| | | | 138/135 |
| 2007/0227608 A1 | 10/2007 | Dupoiron et al. | |
| 2016/0178106 A1* | 6/2016 | Glejbøl | F16L 53/38 |
| | | | 138/130 |

FOREIGN PATENT DOCUMENTS

| | | |
|---|---|---|
| GB | 2 255 104 | 10/1992 |
| WO | WO 01/81809 | 11/2001 |
| WO | WO 2012/059729 | 5/2012 |
| WO | WO 2013/152770 | 10/2013 |

OTHER PUBLICATIONS

Search Report for Application No. GB 1810228.5 dated Dec. 3, 2018; 3 pages.

\* cited by examiner

PIPE BODY CATHODIC PROTECTION

The present invention relates to a method and apparatus for providing corrosion protection to a flexible pipe. In particular, but not exclusively, the present invention relates to the provision of tensile armour layers including monofilament armour wires having a non-circular cross section and elongate anode elements having a substantially circular cross section interposed with adjacent primary armour wire windings. The armour wires and anode elements are formed from different materials.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). A flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Layers may be formed from a single piece such as an extruded tube or by helically winding one or more wires at a desired pitch or by connecting together multiple discrete hoops that are arranged concentrically side-by-side. Depending upon the layers of the flexible pipe used and the type of flexible pipe some of the pipe layers may be bonded together or remain unbonded.

Some flexible pipe has been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C., and is being developed for even more extreme temperatures. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from certain layers such as a pipe carcass or a pressure armour or a tensile armour layer of the flexible pipe body is increased. It is noted for the sake of completeness that flexible pipe may also be used for shallow water applications (for example less than around 500 metres depth) or even for shore (overland) applications.

It is known that an inner fluid retaining layer of a flexible pipe, often referred to as a liner or barrier layer, and an outer fluid retaining layer, referred to as an outer sheath, define between them an annulus region in which various metal structures may be located. For example such metal structures are tensile armour windings or pressure armour windings or the like. Furthermore it is known that if an outer sheath of a flexible pipe is breached in use or on installation ingress of seawater into the annulus region can lead to corrosion of the metallic parts. To prevent corrosion cathodic protection has been utilised. Cathodic protection is a mechanism for providing corrosion protection and such cathodic protection is well known to those skilled in the art. For example recommended practice DNV-RP-B401 or recommended practice DNV-RP-F103 provide guidelines for providing cathodic protection (CP) systems for submarine pipelines and flexible pipe risers. In summary such CP systems rely on the inclusion of metal anodes such as aluminium or zinc blocks which are less noble and thus have a lower reference potential than the metallic regions of a flexible pipe which are to be protected. At a point of contact where an anode is located the flexible pipe metals, such as steel windings, will have the potential of the anode. This potential gradually increases along a length of flexible pipe body away from the anode. The change in potential is caused by attenuation effects due to the resistance of the structure of the metal elements as well as other factors.

Because of these well known attenuation effects, and the fact that anodes used as part of a CP system have conventionally been mounted to end fittings of a flexible pipe, an effective length of flexible pipe body between next adjacent end fittings has been limited. Effectively more end fittings have conventionally been utilised than desired in order to provide anodes, fitted to the end fittings, at a required level of frequency along a pipeline. This requirement to include "extra" end fittings along a flexible pipe has conventionally increased cost and complexity associated with the provision of a subsea pipeline and/or riser.

It is also known from time to time to be able to provide local protection along a whole length of a segment of flexible pipe body in the event of a shield breach on a subsea pipe. Provision of such local protection can be complicated and costly to accommodate.

It is still further known that the manufacturing techniques associated with the manufacture of flexible pipe body and flexible pipes can be a complex and thus costly process.

It is an aim of the present invention to at least partly mitigate one or more of the above-mentioned problems.

It is an aim of certain embodiments of the present invention to provide cathodic protection along a whole length of flexible pipe body.

It is an aim of certain embodiments of the present invention to provide cathodic protection to inner and outer tensile armour wires.

It is an aim of certain embodiments of the present invention to provide an internal anode or internal anodes in close proximity to any material in flexible pipe body that requires protection and to place the anode components in a similar electrolyte (such as oxygen depleted seawater or oxygen rich seawater) as the material which requires protection.

Certain embodiments of the present invention aim to provide effective local anode sites along a whole or part of a length of flexible pipe body to help overcome the issue of attenuation suffered by conventional techniques.

It is an aim of certain embodiments of the present invention to provide a mechanism for obviating attenuation effects from a cathodic protection system along a length of flexible pipe.

It is an aim of certain embodiments of the present invention to provide an electrical connection between layers of a flexible pipe which include metallic components.

It is an aim of certain embodiments of the present invention to provide an anti-fretting layer between opposed layers of a flexible pipe which thus provides a stand off to the opposed layers but which also helps maintain metallic parts in the spaced apart layers in electrical connection.

It is an aim of certain embodiments of the present invention to reduce attenuation effects along a length of flexible pipe body.

According to a first aspect of the present invention there is provided a flexible pipe for subsea transportation of production fluids, comprising:
a fluid retaining layer;
an outer sheath; and
at least one tensile armour layer comprising a plurality of helically wound monofilament armour wires of a first material, each having a non-circular cross section with an aspect ratio of greater than 1:2 disposed between the fluid retaining layer and the outer sheath; wherein
  the tensile armour layer further comprises at least one helically wound elongate anode element substantially having a cross-section aspect ratio of 1:1 and comprising a further material, interposed between armour wires, the anode element cross section having an area that is 50% or less of a corresponding area of said non-circular cross section.

Aptly said further material is more electrically reactive than said first material and is optionally circular, or square, or hexagonal, or I-shaped in cross-section.

Aptly said a further material is more reactive to a corrosive environment of a seawater holding pipe annulus region in the flexible pipe than said first material of the armour wires.

Aptly said a further material of each anode element is at least partially dissolvable in seawater.

Aptly each anode element extends a whole length along the flexible pipe between end fittings that terminate respective ends of the flexible pipe.

Aptly each anode element is a galvanic anode.

Aptly said a further material of each anode element comprises magnesium and/or aluminium and/or zinc.

Aptly each anode element comprises at least one elongate strand of said a further material.

Aptly each anode element comprises a monofilament wire or a wire-strand comprising a plurality of elongate filaments of said a further material.

Aptly the wire-strand anode elements thickness in a radial direction is between 110% and 135% of the thickness of the tensile armour wires in the same tensile armour layer.

Aptly each anode element comprises an elongate core, comprising a still further material, that extends along a whole length of the anode element.

Aptly said still further material of the core has a strength greater than a strength of said further material.

Aptly each anode element comprises a perforated casing, comprising a still further material, that extends along a whole length of the anode element.

Aptly said still further material of the perforated casing has as strength greater than a strength of said further material.

Aptly the tensile armour layer comprises a plurality of elongate anode elements.

Aptly the plurality of elongate anode elements are spaced apart circumferentially in the tensile armour layer.

Aptly the elongate anode elements are evenly distributed circumferentially in the tensile armour later.

Aptly a thickness of each monofilament anode element in a radial direction, is less than a corresponding thickness of each of the tensile armour wires in a common tensile armour layer.

Aptly said a thickness is about 95% to 98% of said a corresponding thickness.

Aptly at least one tape layer on a radially inner and/or radially outer surface of the tensile armour layer, comprising at least one helically wound electrically conductive tape element.

Aptly the tape layer comprises said at least one helically wound electrically conductive tape element and at least one electrically insulating tape element with windings of the electrically insulating tape element being interposed between windings of the electrically conductive tape element.

Aptly the tensile armour layer comprises a radially inner tensile armour layer of the flexible pipe and the tape layer is interposed between the tensile armour layer and a pressure armour layer disposed radially outside of the fluid retaining layer.

According to a second aspect of the present invention there is provided a method of manufacturing flexible pipe body, comprising the steps of:
providing a fluid retaining layer;
providing at least one tensile armour layer by helically winding tensile armour wires of a first material, each having a cross section with an aspect ratio of greater than 1:2, over an underlying layer;
simultaneously helically winding at least one elongate anode element substantially having a cross-section aspect ratio of 1:1 that has an area that is 50% or less than a corresponding area of said anode element cross section, and comprising a further material different to said first material, with the armour wires whereby said at least one anode element is interposed between adjacent armour wires; and
providing an outer sheath.

Aptly the method further comprises helically winding a plurality of discrete elongate anode elements in a circumferentially spaced apart relationship with the armour wires in the tensile armour layer.

Aptly the method further comprises winding each elongate anode element between immediately adjacent armour wires.

Aptly the method further comprises helically winding a plurality of discrete elongate anode elements together in a side-by-side arrangement as a group whereby each group of discrete elongate anode elements is thereby disposed between immediately adjacent armour wires.

Aptly the method further comprises simultaneously winding a plurality of groups of discrete elongate anode elements, in a circumferentially spaced apart relationship, with the armour wires in a tensile armour layer.

According to a third aspect of the present invention there is provided a method of providing corrosion protection to armour wires of at least one tensile armour layer of a flexible pipe having a breached pipe annulus region, comprising:
providing an electron pathway between a plurality of helically wound armour wires of a first material in at least one tensile armour layer and at least one helically wound elongate anode element of a further material; and as seawater enters an annulus region of the flexible pipe via an outer sheath breach, providing an ion pathway between each anode element and the seawater.

Aptly the method further comprises said step of providing an electron pathway comprises providing an electron pathway between the first and further material whereby the first material is different from the further material and the further material is more electrically reactive than the first material.

Certain embodiments of the present invention provide wires of an outer tensile armour layer shielding inner wires and this provides local anode sites to long pipes overcoming attenuation limits.

Certain embodiments of the present invention extend a maximum length of pipes that can be produced and still protected by cathodic protection systems. This can optionally be attained without the need for a mid-line connection which would otherwise be required according to conventional techniques.

Certain embodiments of the present invention provide anodes which can be secured to end fittings or to flexible pipe body itself along a length of a flexible pipe and these anodes are connected to elongate anode elements that run as a surrogate for tensile armour wires internally within flexible pipe body along a whole or part of the length of the flexible pipe body.

Certain embodiments of the present invention replace one or several tensile armour wires in a flexible pipe with an anode element sharing a suitable geometry to provide a distributed cathodic protection to flexible pipes. Such anode elements provide local protection in the event of a shield breach on a subsea pipe.

Certain embodiments of the present invention provide a method of effectively electrically connecting metallic elements from multiple layers in flexible pipe body together. As a result resistance along a length of flexible pipe is reduced thus reducing attenuation effects.

Certain embodiments of the present invention provide an anti-fretting layer that can be used between opposed layer in flexible pipe body and which also includes one or more electrically conducting elements which bridge the space between the separated layers to help provide an electrical connection at repeated locations along the length of flexible pipe body.

Certain embodiments of the present invention will now be described hereinafter, by way of example only, with reference to the accompanying drawings in which.

In the drawings like reference numerals refer to like parts.

Throughout this description, reference will be made to a flexible pipe. It is to be appreciated that certain embodiments of the present invention are applicable to use with a wide variety of flexible pipe. For example certain embodiments of the present invention can be used with respect to flexible pipe and associated end fittings of the type which is manufactured according to API 17J. Such flexible pipe is often referred to as unbonded flexible pipe. Other embodiments are associated with other types of flexible pipe.

Figure 1:
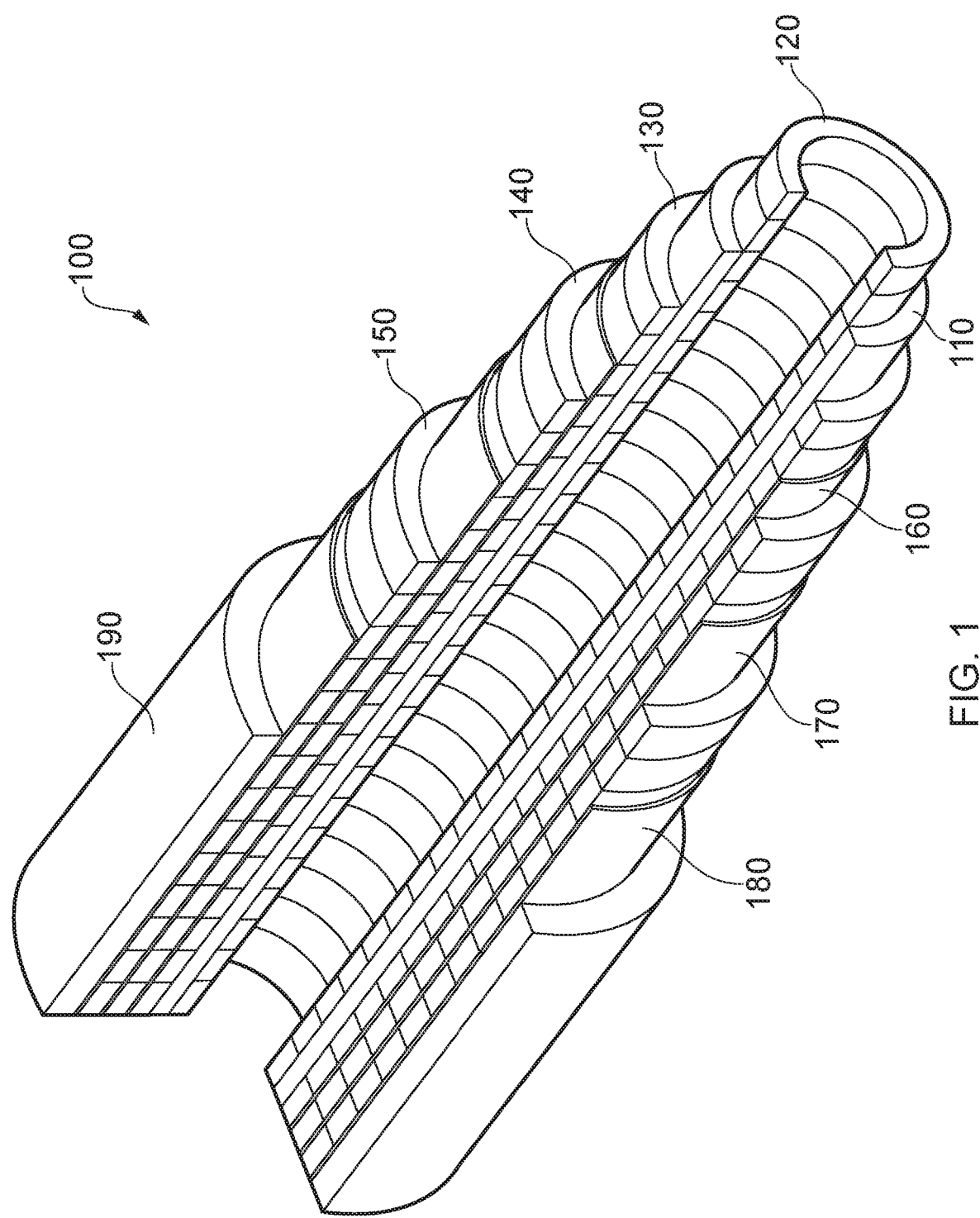
FIG. 1 illustrates flexible pipe body.

Turning to FIG. 1 it will be understood that the illustrated flexible pipe is an assembly of a portion of pipe body and one or more end fittings (not shown in FIG. 1) in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. The pipe body may include one or more layers comprising composite materials, forming a tubular composite layer. It is to be further noted that the layer thicknesses are shown for illustrative purposes only. As used herein, the term "composite" is used to broadly refer to a material that is formed from two or more different materials, for example a material formed from a matrix material and reinforcement fibres.

A tubular composite layer is thus a layer having a generally tubular shape formed of composite material. Alternatively a tubular composite layer is a layer having a generally tubular shape formed from multiple components one or more of which is formed of a composite material. The layer or any element of the composite layer may be manufactured via an extrusion, pultrusion or deposition process or, by a winding process in which adjacent windings of tape which themselves have a composite structure are consolidated together with adjacent windings. The composite material, regardless of manufacturing technique used, may optionally include a matrix or body of material having a first characteristic in which further elements having different physical characteristics are embedded. That is to say elongate fibres which are aligned to some extent or smaller fibres randomly orientated can be set into a main body or spheres or other regular or irregular shaped particles can be embedded in a matrix material, or a combination of more than one of the above. Aptly the matrix material is a thermoplastic material, aptly the thermoplastic material is polyethylene or polypropylene or nylon or PVC or PVDF or PFA or PEEK or PTFE or alloys of such materials with reinforcing fibres manufactured from one or more of glass, ceramic, basalt, carbon, carbon nanotubes, polyester, nylon, aramid, steel, nickel alloy, titanium alloy, aluminium alloy or the like or fillers manufactured from glass, ceramic, carbon, metals, buckminsterfullerenes, metal silicates, carbides, carbonates, oxides or the like.

The pipe body 100 illustrated in FIG. 1 includes an internal pressure sheath 110 which acts as a fluid retaining layer and comprises a polymer layer that ensures internal fluid integrity. The layer provides a boundary for any conveyed fluid. It is to be understood that this layer may itself comprise a number of sub-layers. It will be appreciated that when a carcass layer 120 is utilised the internal pressure sheath is often referred to by those skilled in the art as a barrier layer. In operation without such a carcass (so-called smooth bore operation) the internal pressure sheath may be referred to as a liner. A barrier layer 110 is illustrated in FIG. 1.

It is noted that the carcass layer 120 is a pressure resistant layer that provides an interlocked construction that can be used as the innermost layer to prevent, totally or partially, collapse of the internal pressure sheath 110 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass) whilst certain other embodiments are applicable to "smooth bore" applications. Aptly the carcass layer is a metallic layer. Aptly the carcass layer is formed from stainless steel, corrosion resistant nickel alloy or the like. Aptly the carcass layer is formed from a composite, polymer, or other material, or a combination of materials and components. A carcass layer is radially positioned within the barrier layer.

The pressure armour layer 130 is a pressure resistant layer that provides a structural layer that increases the resistance of the flexible pipe to internal and external pressure and mechanical crushing loads. The layer also structurally supports the internal pressure sheath. Aptly as illustrated in FIG. 1 the pressure armour layer is formed as a tubular layer. Aptly for unbonded type flexible pipe the pressure armour layer consists of an interlocked construction of wires with a lay angle close to 90°. Aptly the lay angle is between 80° and 90° to the axis of the pipe body. Aptly in this case the pressure armour layer is a metallic layer. Aptly the pressure armour layer is formed from carbon steel, aluminium alloy or the like. Aptly the pressure armour layer is formed from a pultruded composite interlocking layer. Aptly the pressure armour layer is formed from a composite formed by extrusion or pultrusion or deposition or winding, followed by consolidation. A pressure armour layer is positioned radially outside an underlying barrier layer.

The flexible pipe body also includes a first tensile armour layer 140 and second tensile armour layer 150. Each tensile armour layer is used to sustain tensile loads and optionally also internal pressure. Aptly the primary tensile armour windings are metal monofilament wires (for example steel, stainless steel or titanium or the like). For flexible pipes according to certain other embodiments of the present invention the primary tensile armour windings are polymer composite tape windings (for example provided with either thermoplastic, for instance nylon, matrix composite or thermoset, for instance epoxy, matrix composite). The composite tape is thus formed into a monofilament wire that can be wound. The tensile armour layer is formed from a plurality of primary monofilament wires. (To impart strength to the layer) that are located over an inner layer and are helically wound along the length of the pipe at a lay angle typically between about 10° to 55°. Aptly multiple tensile armour layers are counter-wound in pairs. Aptly the tensile armour layers are metallic layers. Aptly the tensile armour layers are primary windings formed from carbon steel, stainless steel, titanium alloy, aluminium alloy or the like. Aptly the tensile armour layers are formed from a composite, polymer, or other material, or a combination of materials.

Aptly the flexible pipe body includes optional layers of tape 160, 170, 180 which help contain underlying layers and to some extent prevent abrasion between adjacent layers. The tape layer may optionally be a polymer or composite or a combination of materials, also optionally comprising a tubular composite layer. Tape layers can be used to help prevent metal-to-metal contact to help prevent wear. Tape layers over tensile armours can also help prevent "birdcaging".

The flexible pipe body also includes optional layers of insulation and/or metal winding or polymer layers or tape layers or layers including special materials such as optical fibres and an outer sheath 190, which comprises a polymer layer used to protect the pipe against penetration of seawater and other external environments, corrosion, abrasion and mechanical damage. Any thermal insulation layer helps limit heat loss through the pipe wall to the surrounding environment and may comprise layers of tape or at least one extruded layer of insulating material.

Each flexible pipe comprises at least one portion, referred to as a segment or section, of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
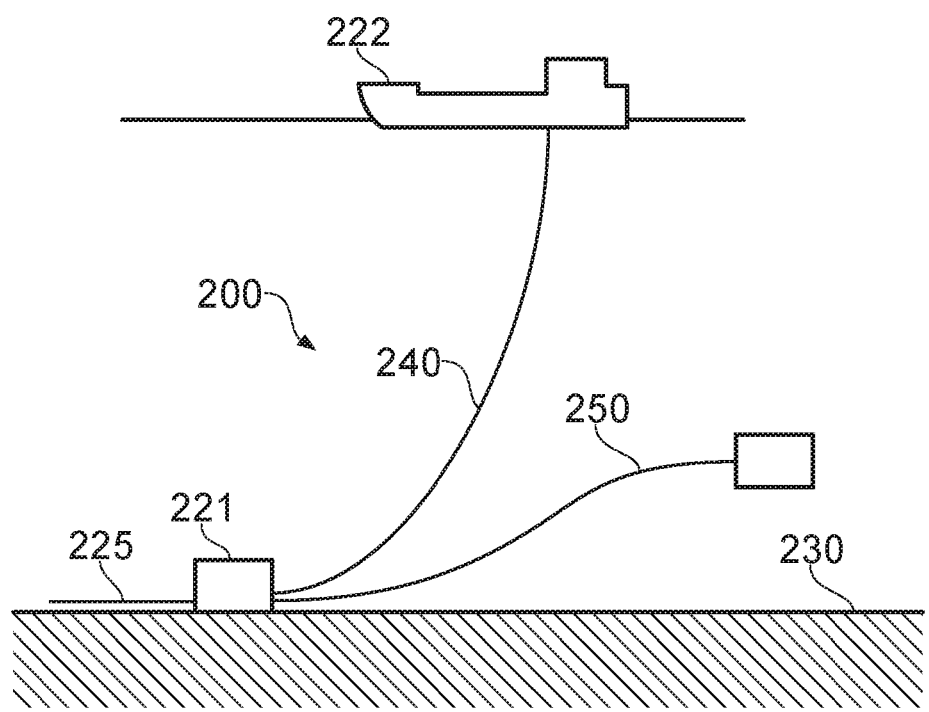
FIG. 2 illustrates uses of flexible pipe incorporating the flexible pipe body.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line 225. The flexible flow line 225 comprises a flexible pipe, wholly or in part, resting on the sea floor 230 or buried below the sea floor and used in a static application. The floating facility may be provided by a platform and/or buoy or, as illustrated in FIG. 2, a ship. The riser assembly 200 is provided as a flexible riser, that is to say a flexible pipe 240 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free-hanging, catenary riser), a riser restrained to some extent (buoys, chains), totally restrained riser or enclosed in a tube (I or J tubes). Some, though not all, examples of such configurations can be found in API 17J. FIG. 2 also illustrates how portions of flexible pipe can be utilised as a jumper 250.

Figure 3:
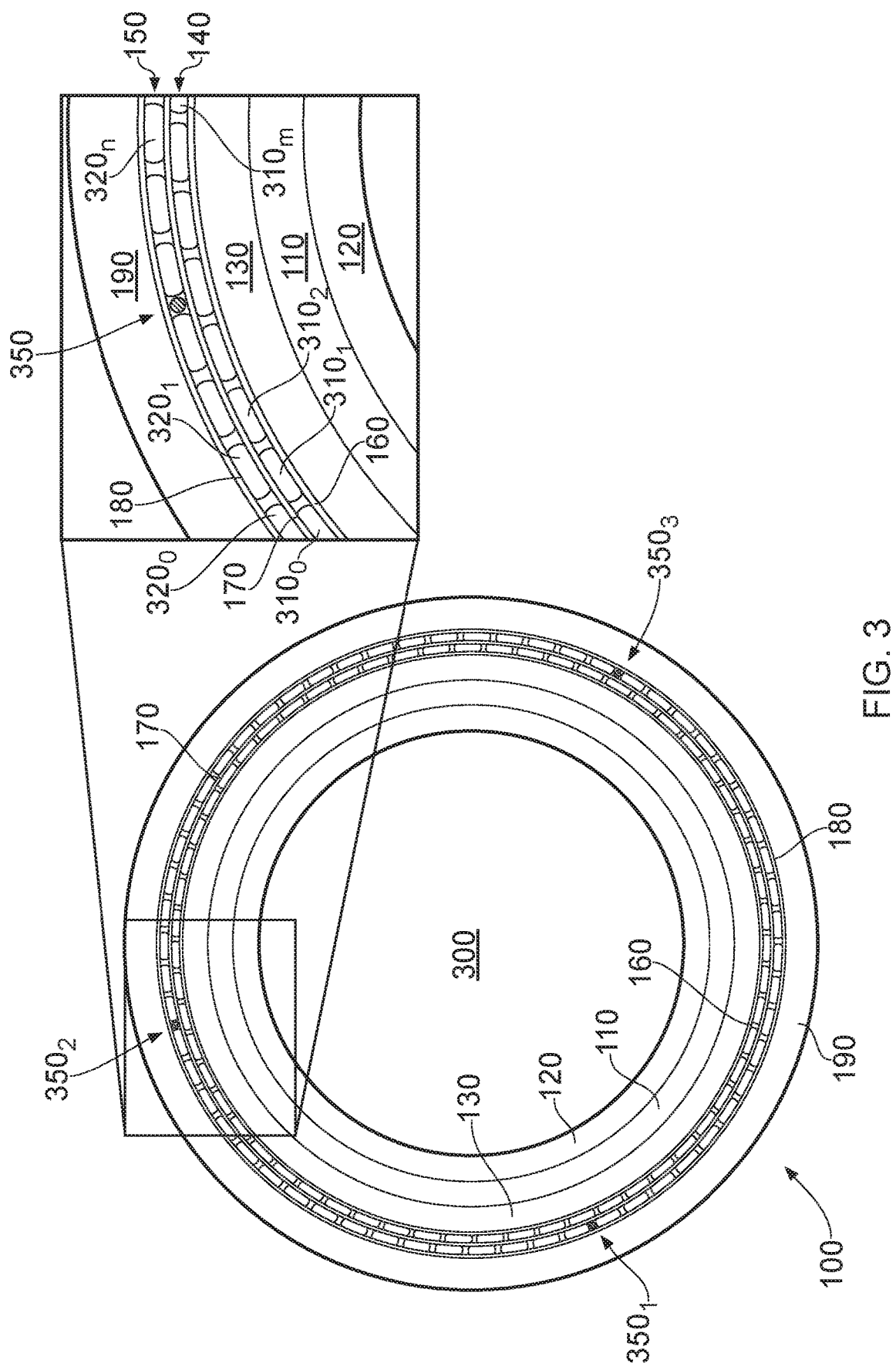
FIG. 3 illustrates a cross section along a length of flexible pipe body.

FIG. 3 illustrates a cross section through a length of the flexible pipe body 100 shown in FIG. 1 in more detail. As shown in FIG. 3 a carcass layer 120 supports a barrier layer 110. An inner surface of the barrier layer 110 provides the fluid retaining surface which defines a bore region 300 along which transport of production fluids can take place. The direction of flow of the production fluid would be in or out of the page in FIG. 3.

An innermost tape layer 160 is located on a radially outermost surface of the pressure armour layer 130 to help support windings of the pressure armour layer. This innermost tape layer 160 also helps provide anti-fretting effects between the inner/underlying pressure armour layer 130 and windings of the first tensile armour layer 140. Adjacent windings $310_{0, 1 \ldots m}$ of tensile armour wire of the first tensile armour layer are illustrated in FIG. 3. The innermost tape layer 160 is an intermediate layer between a pressure armour layer 130 and an inner tensile armour layer 140.

A further tape layer 170 is an intermediate layer between the first tensile armour layer 140 and the second tensile armour 150. Adjacent windings $320_{0, 1 \ldots n}$ of the second tensile armour wire help provide the outer tensile armour layer 150.

A further tape layer 180 is wound outside the second tensile armour layer 150. This helps provide support and anti-birdcaging effects to the tensile armour layer/s. The outer sheath 190 is formed outside the outer tape layer 180. This further tape layer 180 is an intermediate layer between the outer tensile armour layer and an overlying layer.

FIG. 3 also helps show how each tensile armour wire has an aspect ratio of greater than 1:2. That is to say a cross section of each monofilament armour wire has a length greater than twice its thickness (in the radial direction when wound).

FIG. 3 still further helps to show how the outermost tensile armour layer includes at least one helically wound elongate anode element $350_{1, 2, 3}$. Three such windings are shown in FIG. 3. One of these $350_2$ is shown more clearly in the enlarged view of a portion of the cross section of the flexible pipe body. It will be appreciated that such anode elements can be wound as circumferentially spaced apart elements (as shown in FIG. 3) or can be grouped together. Alternatively groups of anode elements 350 can be circumferentially spaced apart through the cross section. Advantageously when the tensile armour wire aspect ratio is a multiple of the aspect ratio of the anode element then the multiple anode elements may replace only a single tensile armour wire and the anode elements may be evenly distributed around the circumference of the tensile armour layer. As an example in FIG. 3 the aspect ratio of the tensile armour wire is 3:1, and there are three evenly distributed anode elements, of aspect ratio 1:1, roughly 120 degrees apart wound within the layer.

Each anode element 350 is an elongate body, substantially of aspect ratio 1:1, that can be helically wound, in part, in place of a tensile armour wire. Each anode element has a length that extends a significant length along the flexible pipe body. Optionally each anode element extends all the way along a flexible pipe between end fittings. Alternatively the anode elements may only extend a predetermined distance within the flexible pipe body. For example half a whole length or a third of a whole length or 20 m or 50 m or the like. Each anode element can be of a similar or different length.

The anode element shown in FIG. 3 is a monofilament structure that has a circular cross section. The area of the cross-section of an anode element is therefore 50% or less of a corresponding area of the cross-section of the tensile armour wires with aspect ratio of at least 2:1.

Each anode element is manufactured from, or at least comprises, a material that is different from a first material which the tensile armour is comprised of. The further material of the anode elements is more electrically reactive than the first material. The material of the anode windings is more reactive to a corrosive environment of a seawater holding annulus. That is to say if in use an outer sheath is breached and the annulus region in the flexible pipe floods with seawater the anode windings material is more reactive to the corrosive environment than the material of the primary tensile armour windings. Optionally the further material of the anode elements is at least partially dissolvable in seawater.

Optionally the anode elements behave as galvanic anodes. Aptly each anode element is a magnesium and/or aluminium and/or zinc wire, or an alloy of these, separately, or in combination.

Figure 4:
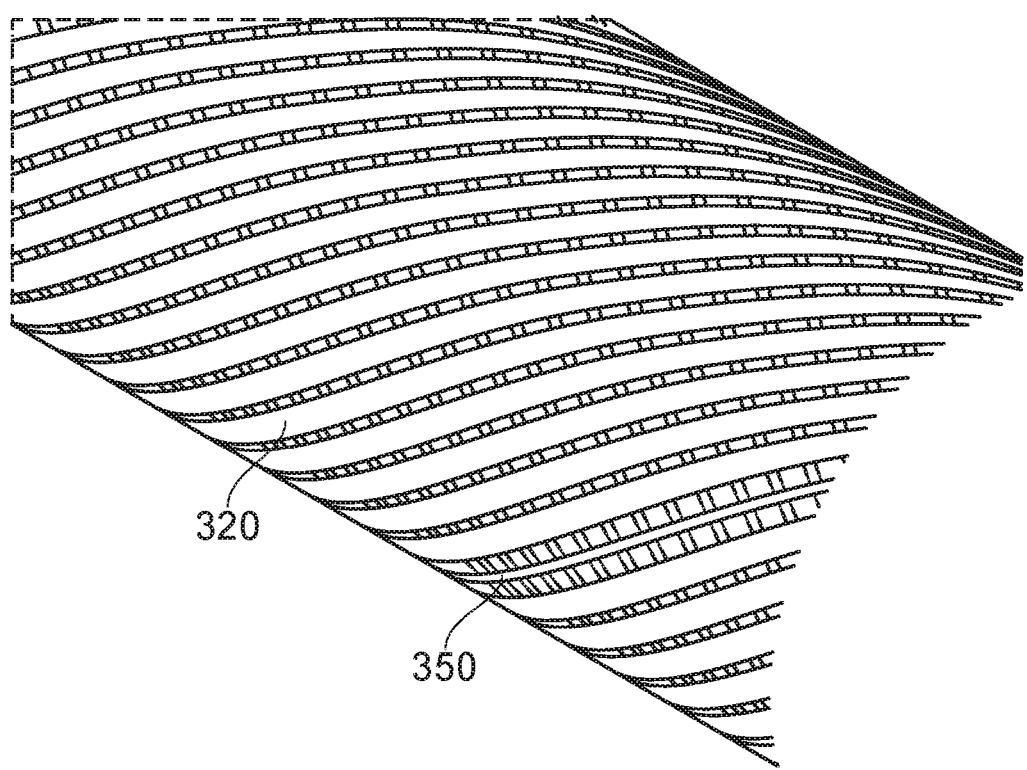
FIG. 4 illustrates a flexible pipe body layer including tensile armour windings and an anode winding.

FIG. 4 helps illustrate how a round anode wire 350 can be helically wound in the tensile armour layer 150 between adjacent windings 320 of the monofilament tensile armour windings. Only the primary windings and anode windings of a single flexible pipe body layer are shown in FIG. 4 for the sake of clarity.

Figure 5A:
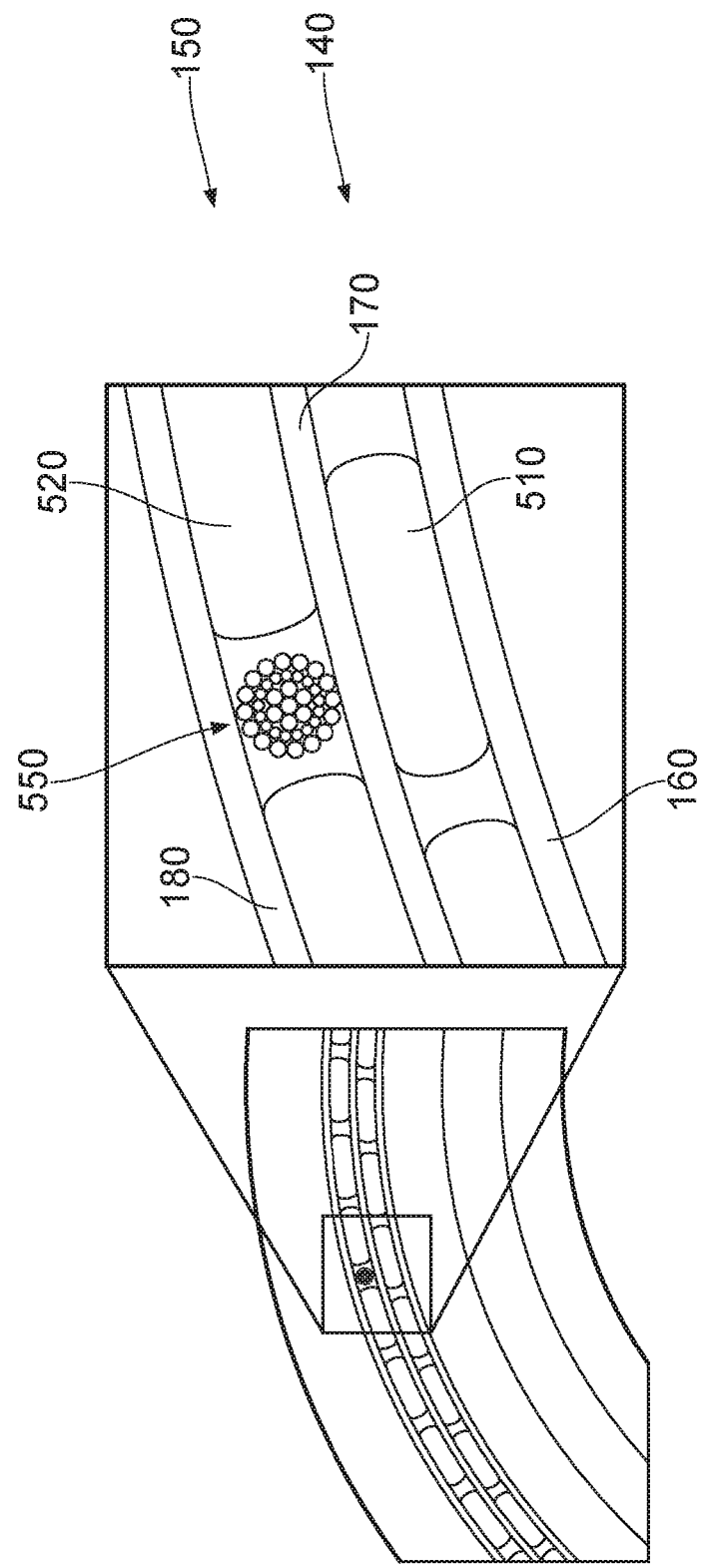
FIG. 5 illustrates an alternative tensile armour layer with strands of anode material arranged longitudinally in a wire-strand to provide an anode element.

FIG. 5A illustrates an alternative embodiment of the present invention in many ways similar to the embodiment previously described. In this embodiment an outer tensile armour layer 150 is provided by windings of a primary tensile armour wire and windings of an anode element. The tensile armour wires are monofilament structures having an aspect ratio of greater than 1:2 (that is to say they have a width greater than their height). Each anode element is a multi-filament structure with filaments spirally wound into a wire-strand or wire-rope arrangement. Some of the filaments have a cross-section greater than others for the purpose of improving the packing of the wire-strand or wire-rope (increasing cross-sectional area, and reducing free volume in the cross-section of the anode element). All of the anode element filaments in FIGS. 3, 4 and 5A have a circular cross section. The overall cross-section of the anode element, which itself is formed from multiple components, is substantially circular, and therefore has an aspect ratio of 1:1. It will be appreciated that some filaments may have alternative shapes in cross-section and/or may be manufactured from, or contain, different materials. The cross-sectional area of the combined cross-section of all of the filaments of each anode element (that is to say the cross section of the anode element) has an area that is 50% or less of a corresponding area of the cross section of the primary tensile armour windings, and an aspect ratio substantially of 1:1.

Figure 5B:
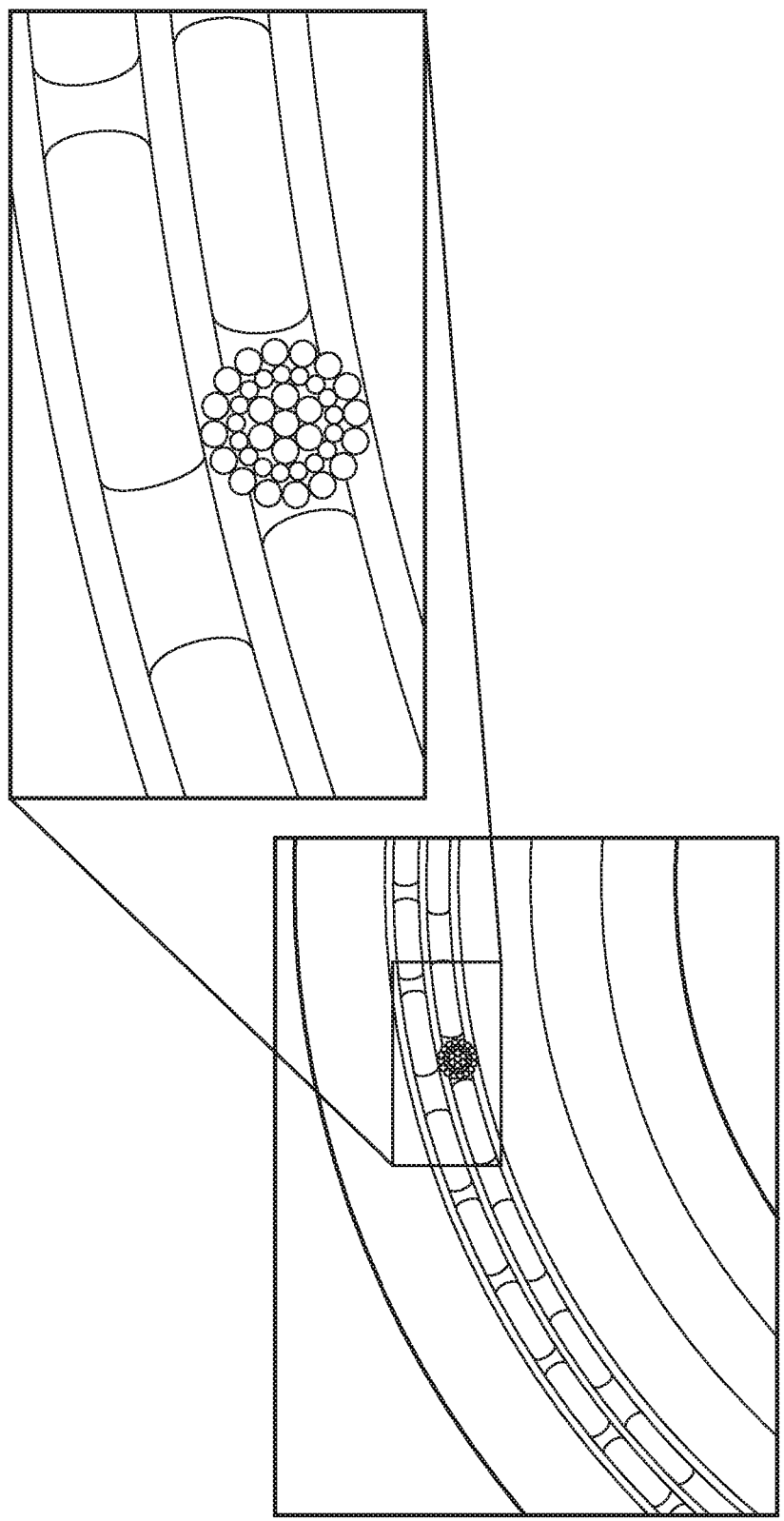

Advantageously FIG. 5B shows the wire-strand anode element of a thickness in a radial direction which is slightly greater than the thickness of the tensile armour wires in the same tensile armour layer. As a result of this it is possible to incorporate anode elements in the inner tensile armour layer 140 and use the wire itself to penetrate the thin tape layers either side of that layer and make electrical contact with all the wires in the pipe layer either side of it (pressure armour layer 130, and tensile armour layer 150), without the need for continuity to be made through conductive tapes. The amount by which the wire-strand or wire-rope anode element thickness must be greater than the thickness of the tensile armour layer 140, to break through the tape layers 170 and 160 and achieve continuity with them will depend on the thickness of those tape layers. Tape layers may sum cumulatively (with overlaps) up to around 1 mm in radial thickness, therefore the anode element thickness may need to be up to 2 mm thicker than the tensile armour layer in which the anode element is wound. Typically however tape layers are thinner than this and, to be effective in this way, the anode element may be as little as 10% thicker than the tensile armour wires 310 of the tensile armour layer 140; depending on the flexible pipe body design and the tape materials however the anode element may be as much as 35% thicker than the tensile armour wires 310 of the same tensile armour layer 140.

One or more of the filaments, and optionally all of the filaments, that make up the windable anode element comprise a material different from the material of the tensile armour windings. Optionally the material of the anode elements is more electrically active than the material of the tensile armour windings.

Figure 5E:
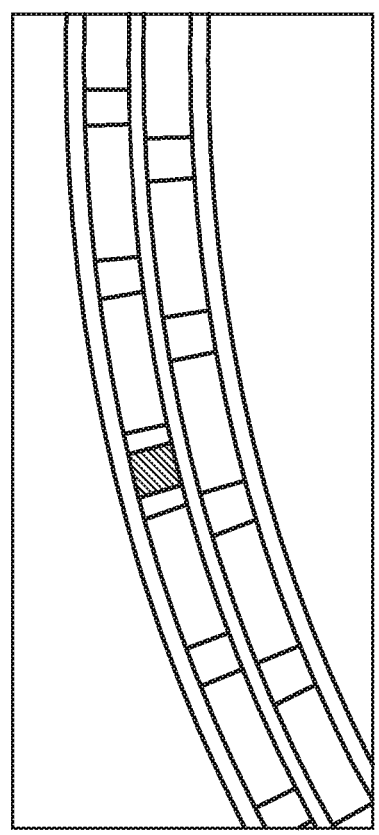
Figure 5C:
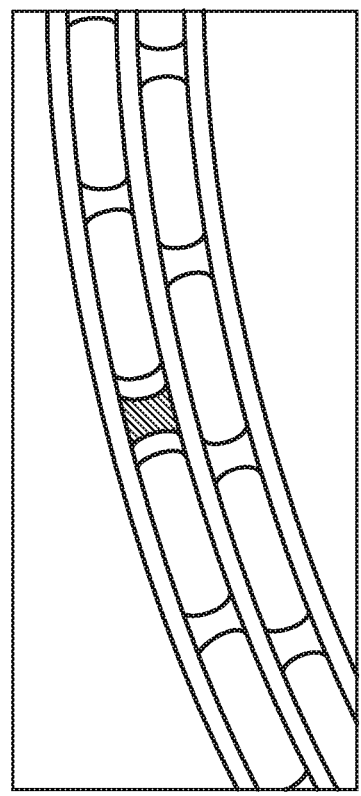
Figure 5D:
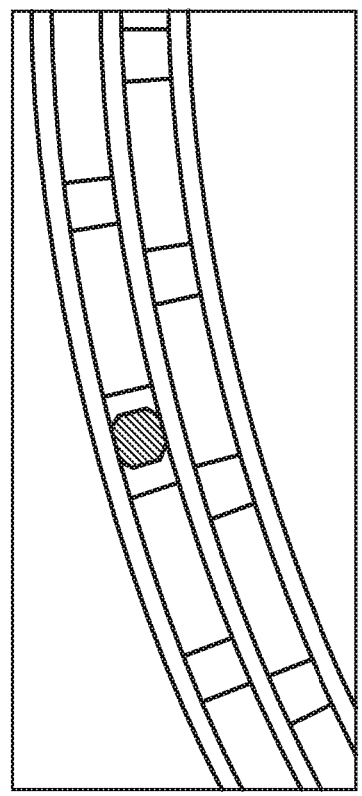

FIGS. 5C to 5E illustrate further alternative anode elements shapes with aspect ratios substantially of 1:1, which may be selectable or preferable, in order to improve design parameters for the flexible pipe body (for instance, to increase the tensile armour layer fraction-fill, an anode element approximating the negative of the shape of the edges of the tensile armour wires may be selected, and/or to maximise the contact area with over-lying or under-lying conductive tapes, as can be seen in the FIGS. 5C to 5E. FIG. 5C illustrates a H (or hourglass) shaped cross section for an anode element. FIG. 5D illustrates a square with truncated corner (Octagon) shaped cross section. FIG. 5E illustrates a square cross section.

Figure 6:
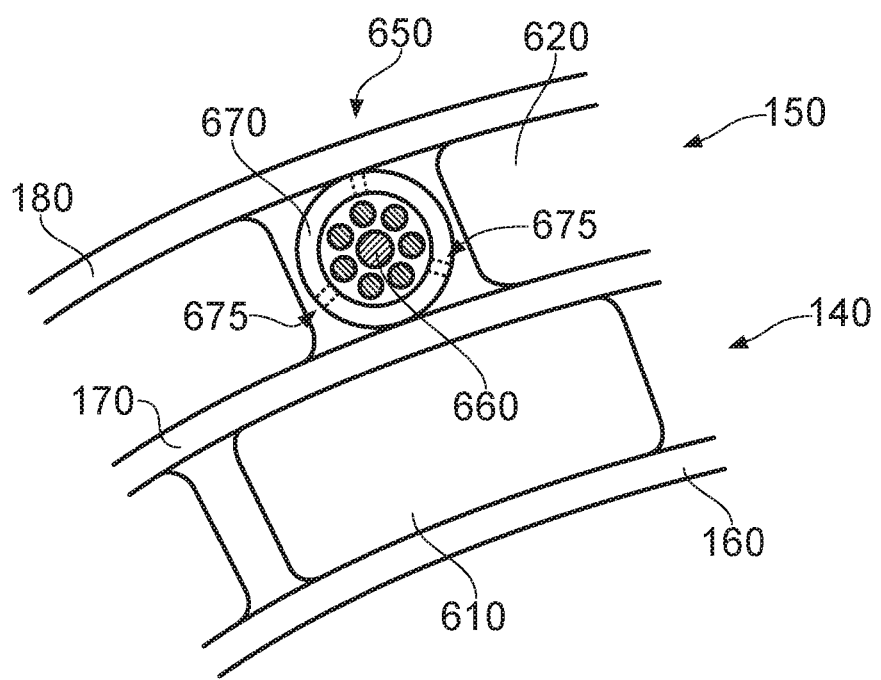
FIG. 6 illustrates an alternative tensile armour layer with an anode element that includes a casing, a core and multiple anode material strands.

FIG. 6 illustrates a still further embodiment of the present invention in which an inner tensile layer 140 is radially inside an outer tensile layer 150. An outer tape layer is radially outside the outer tensile layer. An inner tape layer 160 is radially inside the inner tensile layer. An intermediate tape layer is between the inner and outer tensile armour layers. As illustrated the outer tensile layer has at least one elongate and windable anode element 650 wound between the monofilament tensile armour windings. As with the previously described embodiments the tensile armour layer can include just one anode element or can include multiple helically wound elongate elements. The anode elements can be wound separately between adjacent primary tensile armour windings or can be wound in groups between adjacent tensile armour windings.

The anode element 650 in FIG. 6 has a core 660 and an outer casing 670. The outer casing has perforations 675 (shown via dotted lines) that make the casing non-fluid-tight. Strands (seven shown in FIG. 6) of an anode material are located between the core 660 and casing 670. The core provides a strength to the anode element. Likewise the casing provides a strength to the anode element. Optionally a core and surrounding anode strands without a casing can be utilised. Optionally a perforated casing and inner anode filaments (or a single internal monofilament anode wire) can be used without a core. Aptly the perforated casing provides a crush resistance to radial forces and/or tensile strength. Aptly the core provides a support for the surrounding filaments of anode material and/or tensile strength.

Figure 7:
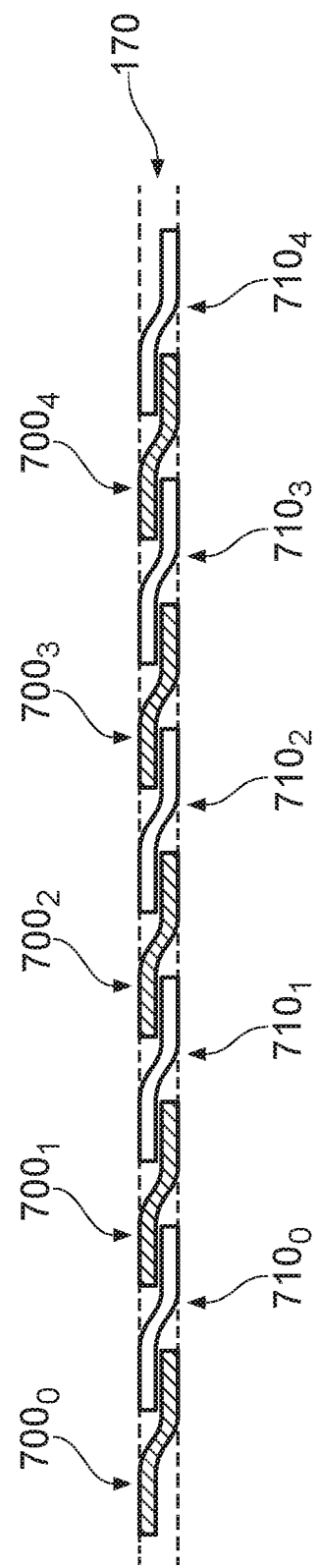
FIG. 7 illustrates an intermediate layer provided by both electronically conducting and electrically insulating tapes.

FIG. 7 helps illustrate an intermediate tape layer 170 in more detail. It will be appreciated that the further intermediate tape layers 160, 180 could be similarly provided. As illustrated in FIG. 7 the tape layer is a relatively thin layer formed by winding thin, long, substantially flat, strips helically around an underlying layer. Optionally the elongate strips of tape for certain intermediate layers can be an electrically insulating material and are used to provide anti-fretting properties (preventing adjacent metallic layers from rubbing against each other). Alternatively, as illustrated in FIG. 7, an intermediate tape layer can be formed by winding two different strips each having different characteristics. In FIG. 7 an electrically insulating tape formed by polypropylene or the like is wound over an underlying layer (in the example shown in FIG. 7 over the innermost tensile armour layer 140). The tape is thin and flexible so that adjacent windings $700_{0, 1 \ldots 4}$ of tape overlap and curve. Windings $710_{0, 1 \ldots 4}$ of a further strip-like tape are illustrated in FIG. 7. These are formed from a metallic material such as steel or the like. Other electrically conducting materials such as, but not limited to, copper, aluminium, nickel, gold or silver foil or tapes comprising alloys of these or comprising other conductive materials such as graphene or the like could optionally be utilised. The electrically insulating windings and electrically conductive windings are interposed. In this way the tape layer provides a combination of cheap and flexible anti-fretting characteristics together with an electrically conductive pathway which electrically connects an underlying layer such as a metallic underlayer with an overlying layer such as a metallic overlayer (for example anode elements and/or primary monofilament tensile armour wire windings of a first tensile armour layer 140 can be electrically connected to a second tensile armour layer 150). As a result the windings (primary and/or anode element) of an overlying layer and the windings of an underlying layer are electrically interconnected via an intermediate layer. As a result a net electrical resistance offered by any metallic layer which extends along a length of the flexible pipe body is reduced. As a result attenuation effects otherwise expected with CP systems are significantly reduced. As a result a frequency of anode elements that are needed along a length of flexible body is reduced relative to conventional techniques. It will also be understood that the thicknesses of each type of tape may vary and do not have to be similar, as is shown in FIG. 7. For instance, the electrically insulating windings may be twice the thickness of the electrically conductive windings, or even greater, for instance up to 50 times thicker (an example being a thin metal foil of thickness 0.05 mm is applied as a conductive tape with an insulating polypropylene tape of 2.5 mm thickness).

An intermediate tape layer which includes electrically conducting elements and electrically insulating elements enables a variety of materials to be used and makes use of material characteristics to the best of those materials ability. For example electrically insulating materials can be utilised which provide superior anti-fretting and/or support capabilities. Additionally a material that is highly electrically conductive can be utilised and distributed as a winding throughout the intermediate layer to provide a bridge forming an electrical connection between otherwise spaced apart layers. By electrically connecting opposed layers together an electrical resistance per unit length of the flexible pipe body is much reduced relative to conventional techniques and thus attenuation effects can be reduced. As a result anode elements are needed less frequently along a length of flexible pipe body than would otherwise be needed according to conventional techniques to provide a desired level of cathodic protection. It will be appreciated that whilst the intermediate layer shown in FIG. 7 includes an electrically insulating tape wound adjacent to, and sequentially alternating with, an electrically conductive tape it is possible according to certain embodiments of the present invention to utilise multiple insulating tape windings with a single electrically insulating tape winding or vice versa depending upon desire.

Optionally windings for the intermediate layers can be formed from only electrically conductive tape.

Whilst certain embodiments of the present invention have been described above with an outer tensile armour wire formed to include elongate windable anode elements other embodiments utilise similar anode element windings in just the inner tensile layer or both the inner and outer tensile armour layer.

Aptly the tapes are wound helically around an underlying layer using a winding station that rotates with one or more sources of tape feeding the insulating tape/s and electrically conducting tape/s to respective touchdown points. Those touchdown points enable each continuous elongate tape to be simultaneously wound albeit at offset positions circumferentially and/or longitudinally. In this way immediately next windings of a different tape can have a 0-90% overlap with an immediately preceding winding (which may be of the same or different tape type). Aptly there is at least a partial overlap of the tape windings.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A flexible pipe for subsea transportation of production fluids, comprising:
    a fluid retaining layer;
    an outer sheath; and
    at least one tensile armour layer comprising a plurality of helically wound monofilament armour wires of a first material, each having a non-circular cross section with an aspect ratio of greater than 1:2 disposed between the fluid retaining layer and the outer sheath; wherein
    the tensile armour layer further comprises at least one helically wound elongate anode element substantially having a cross-section aspect ratio of 1:1 and comprising a further material, interposed between armour wires, the anode element cross section having an area that is 50% or less of a corresponding area of said non-circular cross section.

2. The flexible pipe as claimed in claim 1 wherein said further material is more electrically reactive than said first material and is optionally circular, or square, or hexagonal, or I-shaped in cross-section.

3. The flexible pipe as claimed in claim 1, further comprising:
    said a further material is more reactive to a corrosive environment of a seawater holding pipe annulus region in the flexible pipe than said first material of the armour wires.

4. The flexible pipe as claimed in claim 1, further comprising:
    said a further material of each anode element is at least partially dissolvable in seawater.

5. The flexible pipe as claimed in claim 1 wherein each anode element extends a whole length along the flexible pipe between end fittings that terminate respective ends of the flexible pipe.

6. The flexible pipe as claimed in claim 1 wherein each anode element is a galvanic anode.

7. The flexible pipe as claimed in claim 1 wherein each anode element comprises at least one elongate strand of said a further material.

8. The flexible pipe as claimed in claim 7, further comprising:
    each anode element comprises a monofilament wire or a wire-strand comprising a plurality of elongate filaments of said a further material and optionally the wire-strand anode elements thickness in a radial direction is between 110% and 135% of the thickness of the tensile armour wires in the same tensile armour layer.

9. The flexible pipe as claimed in claim 1, further comprising:
    each anode element comprises an elongate core, comprising a still further material, that extends along a whole length of the anode element and optionally said still further material of the core has a strength greater than a strength of said further material.

10. The flexible pipe as claimed in claim 1, further comprising:
    each anode element comprises a perforated casing, comprising a still further material, that extends along a whole length of the anode element and optionally said still further material of the perforated casing has as strength greater than a strength of said further material.

11. The flexible pipe as claimed in claim 1, further comprising:
    the tensile armour layer comprises a plurality of elongate anode elements.

12. The flexible pipe as claimed in claim 11, further comprising:
    the plurality of elongate anode elements are spaced apart circumferentially in the tensile armour layer.

13. The flexible pipe as claimed in claim 12, further comprising:
    the elongate anode elements are evenly distributed circumferentially in the tensile armour later.

14. The flexible pipe as claimed in claim 1, further comprising:
    a thickness of each monofilament anode element in a radial direction, is less than a corresponding thickness of each of the tensile armour wires in a common tensile armour layer and optionally said a thickness is about 95% to 98% of said a corresponding thickness.

15. The flexible pipe as claimed in claim 1, further comprising:
    at least one tape layer on a radially inner and/or radially outer surface of the tensile armour layer, comprising at least one helically wound electrically conductive tape element.

16. The flexible pipe as claimed in claim 15, further comprising:
    the tape layer comprises said at least one helically wound electrically conductive tape element and at least one electrically insulating tape element with windings of the electrically insulating tape element being interposed between windings of the electrically conductive tape element.

17. The flexible pipe as claimed in claim 16, further comprising:
    the tensile armour layer comprises a radially inner tensile armour layer of the flexible pipe and the tape layer is interposed between the tensile armour layer and a pressure armour layer disposed radially outside of the fluid retaining layer.

18. A method of manufacturing flexible pipe body, comprising the steps of:
    providing a fluid retaining layer;
    providing at least one tensile armour layer by helically winding tensile armour wires of a first material, each having a cross section with an aspect ratio of greater than 1:2, over an underlying layer;
    simultaneously helically winding at least one elongate anode element substantially having a cross-section aspect ratio of 1:1 that has an area that is 50% or less than a corresponding area of said anode element cross section, and comprising a further material different to said first material, with the armour wires whereby said at least one anode element is interposed between adjacent armour wires; and providing an outer sheath.

19. The method as claimed in claim 18, further comprising:

helically winding a plurality of discrete elongate anode elements in a circumferentially spaced apart relationship with the armour wires in the tensile armour layer.

* * * * *

UNITED STATES PATENT AND TRADEMARK OFFICE
CERTIFICATE OF CORRECTION

PATENT NO. : 11,592,125 B2
APPLICATION NO. : 17/252905
DATED : February 28, 2023
INVENTOR(S) : Peter Francis Richard Collins Page 1 of 1

It is certified that error appears in the above-identified patent and that said Letters Patent is hereby corrected as shown below:

In the Claims

Column 14, Line 28, Claim 13, delete "later" and insert -- layer --.

Column 14, Line 67, Claim 18, delete "said anode element cross section" and insert -- said a cross section --.

Signed and Sealed this
Twenty-first Day of January, 2025

Coke Morgan Stewart
*Acting Director of the United States Patent and Trademark Office*